United States Patent [19]

Endo

[11] Patent Number: 5,058,486
[45] Date of Patent: Oct. 22, 1991

[54] DIAPHRAGM-HOUSING CONNECTION IN A PNEUMATIC BOOSTER

[75] Inventor: Mitsuhiro Endo, Kanagawa, Japan

[73] Assignee: Tokico Ltd., Kanagawa, Japan

[21] Appl. No.: 553,958

[22] Filed: Jul. 18, 1990

[30] Foreign Application Priority Data

Jul. 20, 1989 [JP] Japan .............................. 1-85279[U]

[51] Int. Cl.⁵ ............................................ F01B 19/00
[52] U.S. Cl. ...................................... 92/48; 92/98 R; 92/96; 91/369.2
[58] Field of Search ................ 92/48, 96, 98 R, 98 D, 92/99; 91/369.1, 369.2, 533

[56] References Cited

U.S. PATENT DOCUMENTS

| | | | |
|---|---|---|---|
| 3,613,506 | 10/1971 | Kytta | 91/369.2 |
| 4,286,501 | 9/1981 | Thomas et al. | 91/369.2 |
| 4,377,966 | 3/1983 | Parker et al. | 92/48 |
| 4,400,942 | 8/1983 | Reinartz et al. | 91/369.2 |
| 4,450,688 | 5/1984 | Boehm | 91/369.2 |
| 4,455,827 | 6/1984 | Margetts | 91/369.2 |
| 4,522,031 | 6/1985 | Kytta et al. | 91/369.2 |
| 4,703,684 | 11/1987 | Bouvot et al. | 92/48 |
| 4,747,336 | 5/1988 | Uyama | 92/98 D |
| 4,854,220 | 8/1989 | Imayoshi | 91/369.1 |
| 4,936,191 | 6/1990 | Kobayashi | 91/369.2 |

FOREIGN PATENT DOCUMENTS

| | | | |
|---|---|---|---|
| 2920249 | 11/1979 | Fed. Rep. of Germany | 92/48 |
| 0077955 | 5/1984 | Japan | 91/369.2 |
| 2053395 | 2/1981 | United Kingdom | 91/369.2 |
| 2069638 | 8/1981 | United Kingdom | 91/369.2 |
| 2070173 | 9/1981 | United Kingdom | 92/48 |
| 2074269 | 10/1981 | United Kingdom | 91/369.2 |

Primary Examiner—Edward K. Look
Assistant Examiner—Thomas Denion
Attorney, Agent, or Firm—Wenderoth, Lind & Ponack

[57] ABSTRACT

A pneumatic booster has a housing which includes a forward shell and a rearward shell, and a diaphragm which is installed inside the housing and secured at the outer peripheral portion thereof to the housing. The diaphragm has a bead formed on the outer peripheral portion thereof. The rearward shell has a bead retaining portion which has a bead retaining groove that opens radially outward. The forward shell has an outer peripheral portion. The bead is received into the bead retaining groove across one edge portion of the bead retaining groove and clamped between the groove and the outer peripheral portion of the forward shell. The dimensions of the bead and the bead retaining portion are set so that the inner diameter of the bead is greater than the outer diameter of the edge portion of the bead retaining groove. Thus, the rearward shell and the diaphragm can be assembled together without the need to bend the diaphragm in advance, and the assembly process is correspondingly facilitated.

7 Claims, 5 Drawing Sheets $di < Do$ $do > Si$    $di > Do$

DIAPHRAGM-HOUSING CONNECTION IN A PNEUMATIC BOOSTER

BACKGROUND OF THE INVENTION

1. Field of the Invention

The present invention relates to a pneumatic booster for use, for example, in an automobile to reduce the brake pedal pressure required for braking.

2. Description of the Prior Art

FIGS. 1 to 4 show a tandem type pneumatic booster as one example of the above-described pneumatic booster.

The tandem type pneumatic booster has a housing 3 which comprises a front shell 1 and a rear shell 2. The interior of the housing 3 is divided by a center shell 4 into a pair of front and rear chambers 5 and 6, in which a front diaphragm 7 and a rear diaphragm 8 are disposed, respectively. The inner peripheral portion of the center shell 4 is slidably fitted with a valve body A. The inner peripheral portions of the front and rear diaphragms 7 and 8 are fixed to the valve body A. The outer periphery of the rear shell 2 is formed with a bead retaining portion 9. More specifically, as is most clearly shown in FIG. 2, the outer peripheral portion of the rear shell 2 is first bent rearwardly at a position 2b and then bent upwardly to form a U-shaped bead retaining groove 9a which opens radially outward. The U-shaped bead retaining groove 9a thus has side wall portions that generally oppose each other, and a bottom portion. The outer peripheral portion of the rear shell 2 that is bent in this way has an outer peripheral end portion 2a which extends radially outward beyond the bending position 2b. The bead retaining portion 9 is formed with an insertion-side edge portion 9b, which is passed by a bead portion of the diaphragm 8 (described later) when inserted into the retaining groove 9a.

The outer peripheral end portion 8a of the rear diaphragm 8 is formed with a ring-shaped bead 10. The bead 10 is accommodated in the groove 9a and clamped by the bead retaining portion 9 and the end portions of the center and front shells 4 and 1, thereby maintaining an airtight state in the rear chamber 6. The dimensions of bead 10 and the bead retaining portion 9 are set so that the inner diameter $d_i$ of the bead 10 is smaller than the outer diameter $D_o$ of the insertion-side edge portion 9b of the bead retaining groove 9a in the bead retaining portion 9, as shown in FIG. 2.

An input shaft 11 is connected to a brake pedal (not shown), and an output shaft 12 is brought into contact with a piston (not shown) of a master cylinder, thereby boosting the force that acts on the piston, and thus enabling a reduction in the pedal pressure required for braking.

In this tandem type pneumatic booster, the inner diameter $d_i$ of the bead 10 is smaller than the outer diameter $D_o$ of the insertion-side edge portion 9b of the bead retaining portion 9. Accordingly, when the diaphragm 8 is to be attached to the rear shell 2, if the rear shell 2 is merely pressed in the direction of the arrow F, with the rear diaphragm 8 being attached to the inner side of the center shell 4, as shown in FIG. 3, the insertion-side edge portion 9b of the bead retaining portion 9 abuts against the bead 10, and it is therefore impossible to assemble these members. For this reason, the bead 10 is bent in advance so as to be located outside the rear end portion 4a of the center shell 4, as shown in FIG. 4, and with the bead 10 left in this bent position, the rear shell 2 is pressed in the direction of the arrow F. After the rear shell 2 has been forced into the center shell 4 to an appropriate position, the bent bead 10 is rebent to fit into the groove 9a. Then, the rear shell 2 is further pressed in the direction of the arrow F until the rear end portion 4b of the center shell 4 abuts against the outer peripheral end portion 2a of the rear shell 2. In this way, the center shell 4, the rear shell 2 and the rear diaphragm 8 are assembled together in an integral structure. The bead 10 of the diaphragm 8 is retained within the groove 9a by the rear end portion 4a of the center shell 4, and there is therefore no fear of the bead 10 disengaging from the groove 9a. Thereafter, the front shell 1 is attached to complete the assembly, as shown in FIG. 1.

However, the conventional pneumatic booster of the type described above needs to bend the bead 10, as shown in FIG. 4, when it is assembled, and hence additional time and labor are required to perform the bending operation, resulting in a lowering in assembly efficiency. In addition, there is a danger that the edge of the bead retaining portion 9 will abut and damage a portion of the diaphragm 8 other than the bead 10 during the assembly process. Accordingly, care must be taken not to damage the diaphragm 8, and this causes assembly efficiency to be further impaired.

SUMMARY OF THE INVENTION

In view of the above-described problems of the prior art, it is an object of the present invention to provide a pneumatic booster which enables superior assembly efficiency.

To this end, the present invention provides a pneumatic booster having a housing which includes a forward shell and a rearward shell, and a diaphragm which is installed inside the housing and secured at the outer peripheral portion thereof to the housing, the diaphragm having a bead formed on the outer peripheral portion thereof, the rearward shell having a bead retaining portion which has a bead retaining groove that opens radially outward, the forward shell having an outer peripheral portion, the bead being received into the bead retaining groove across one edge portion of the bead retaining groove and clamped between the groove and the outer peripheral portion of the forward shell, wherein the dimensions of the bead and the bead retaining portion are set so that the inner diameter of the bead is greater than the outer diameter of the edge portion of the bead retaining groove.

By virtue of the above-described arrangement, when the rearward shell is pressed during assembly, the bead retaining portion is not subjected to any contact resistance from the inner surface of the diaphragm. Accordingly, the rearward shell moves smoothly toward the diaphragm and can be mounted without the need to bend the diaphragm, and the assembly process is facilitated correspondingly.

DESCRIPTION OF THE PREFERRED EMBODIMENT

Figure 1:
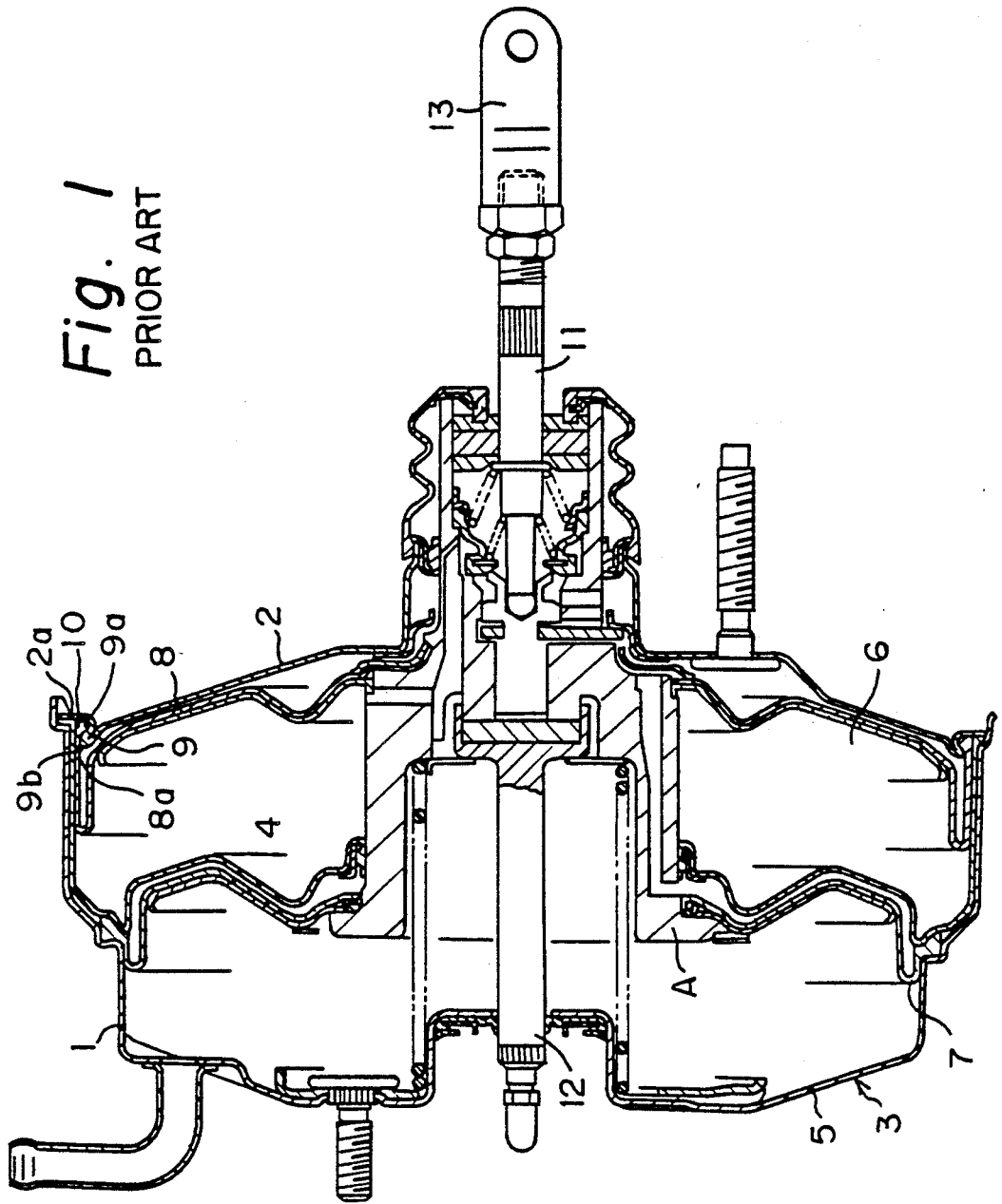
FIG. 1 is a sectional view of one example of conventional pneumatic boosters.
Figure 2:
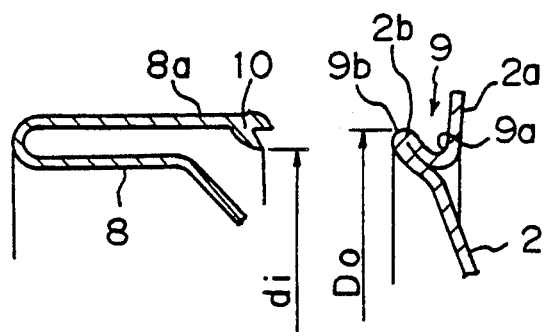
FIG. 2 is an enlarged fragmentary sectional view showing a rear shell and a rear diaphragm in the conventional pneumatic booster.

One embodiment of the present invention will be described below with reference to FIGS. 5 and 6. In this embodiment, the present invention is exemplarily applied to a tandem type pneumatic booster which is similar to that shown in FIGS. 1 to 4, and the same members or portions as those shown in FIGS. 1 to 4 are denoted by the same reference numerals.

Figure 6:
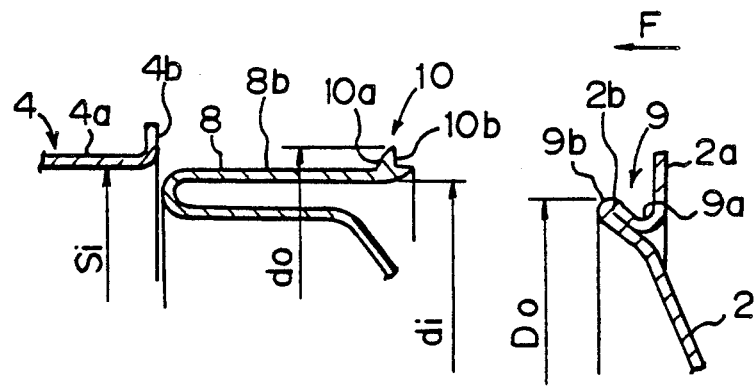
FIG. 6 is an enlarged fragmentary sectional view showing a rear shell and a rear diaphragm in the pneumatic booster according to the present invention and corresponding to FIG. 2.
Figure 3:
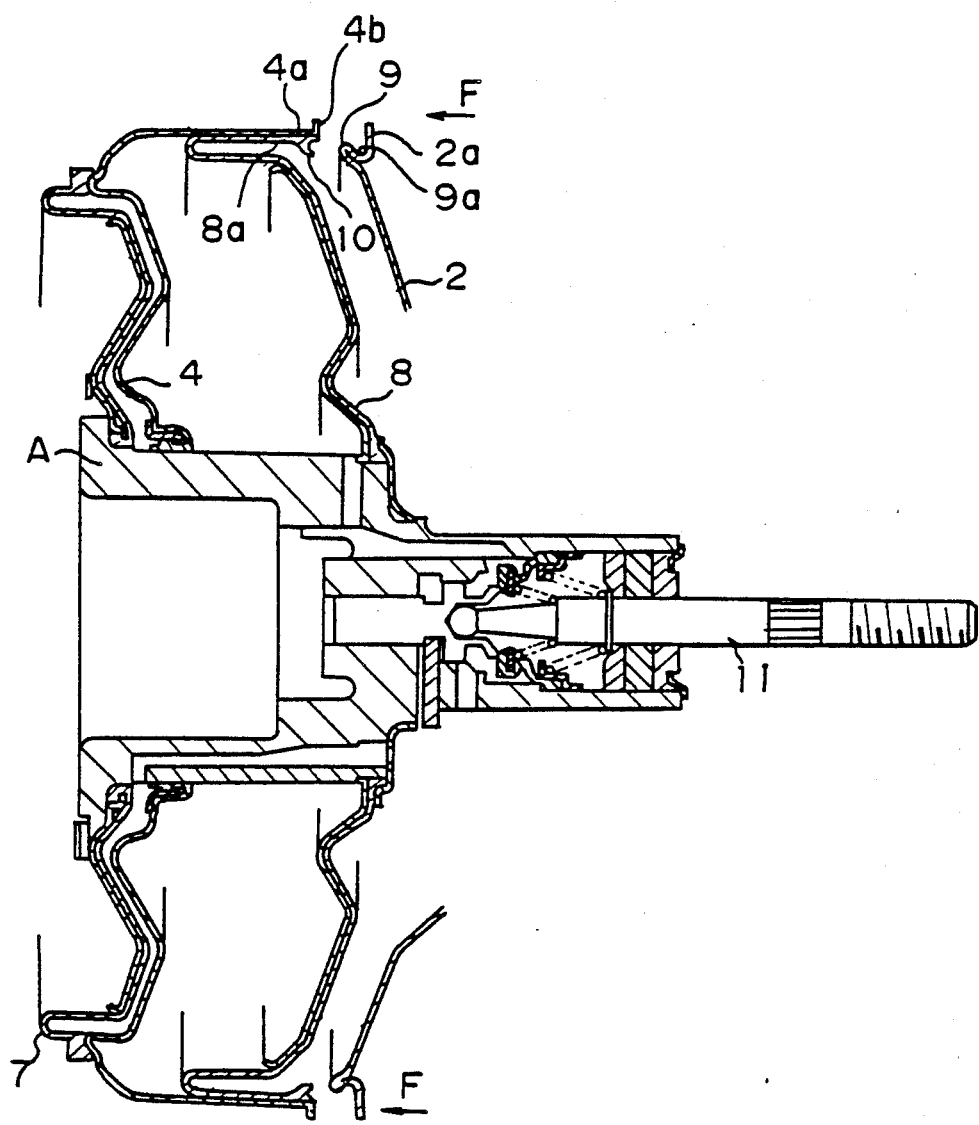
FIG. 3 is a sectional view showing the relative positions of the rear shell and the rear diaphragm in the conventional pneumatic booster when assembled.
Figure 4:
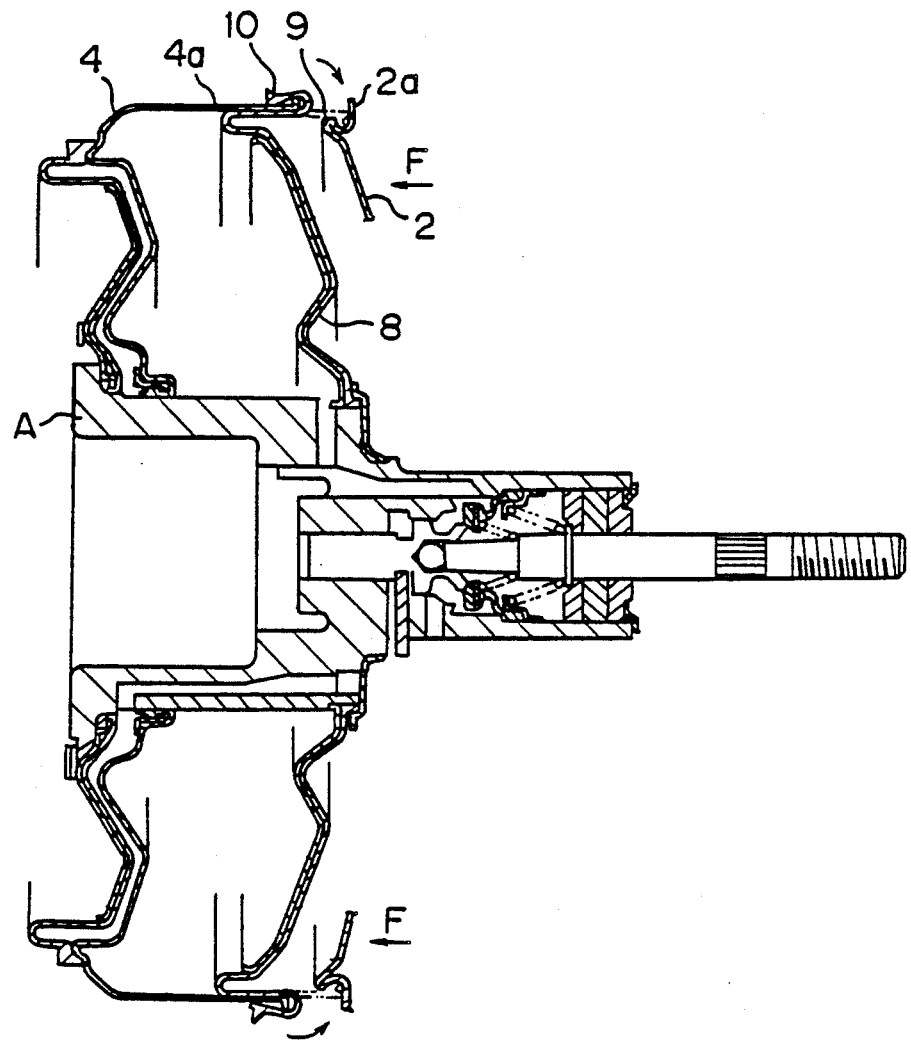
FIG. 4 is a sectional view showing the method of assembly of the conventional pneumatic booster.
Figure 5:
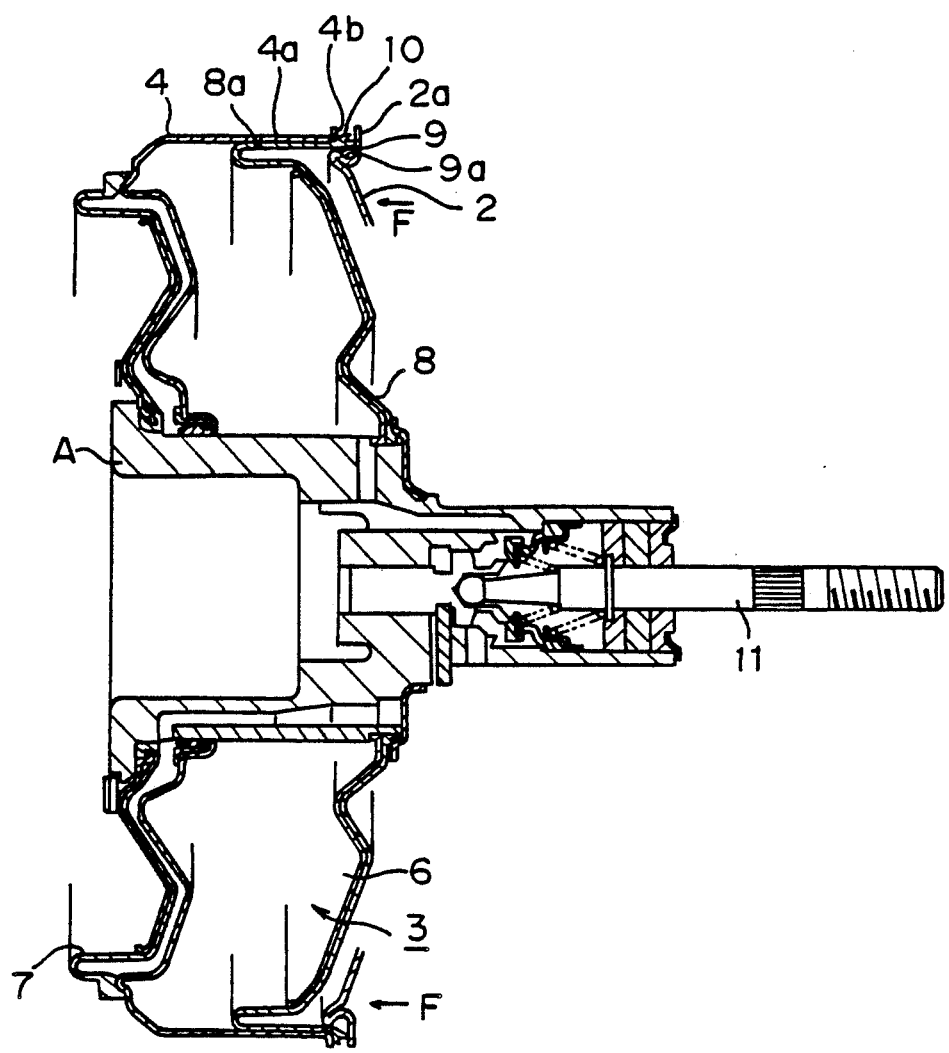
FIG. 5 is a sectional view of one embodiment of the pneumatic booster according to the present invention.

Referring to FIGS. 5 and 6, the outer peripheral end portion 8a of the rear diaphragm 8 is formed with a bead 10 which extends along the outer periphery of the diaphragm 8 in a substantially ring-shaped configuration. As can be seen from the various figures, the diaphragm 8 has an annular portion that extends in a direction substantially perpendicular to the axial direction of the housing, and has a tubular portion which extends from the outer peripheral portion of the annular portion. The tubular portion has the outer peripheral end portion 8a thereon, the bead 10 being formed on the outer peripheral end portion 8a. The bead 10 has a substantially heart-shaped cross-sectional configuration, thus defining a cut portion 10b which opens rearwardly outward as viewed in FIG. 6. The outer edge portion 10a of the bead 10 is slanted so that the diameter thereof gradually increases toward the rear end. The outer diameter $d_o$ of the bead 10 is set so as to be greater than the inner diameter $S_i$ of the center shell 4, which is a forward shell.

In regard to the relationship between the bead 10 and the bead retaining portion 9 that is formed on the rear shell 2, which is a rearward shell, the dimensions are set so that the inner diameter $d_i$ of the bead 10 is greater than the outer diameter $D_o$ of the insertion-side edge portion 9b of the bead retaining portion 9.

To assemble the pneumatic booster arranged as described above, the rear diaphragm 8 is first attached to the center shell 4 in such a manner that the bead 10 is in contact with the rear end portion 4b of the center shell 4 (see FIG. 5). In this case, the outer diameter $d_o$ of the bead 10 is greater than the inner diameter $S_i$ of the center shell 4 and the outer diameter of the tubular portion 8b shell 4 and the outer diameter of the tubular portion 8b of the diaphragm 8 is equal to or slightly greater than the inner diameter $S_i$ of the center shell 4. Accordingly, the rear diaphragm 8 can be tacked to the center shell 2 with only the bead 10 of the rear diaphragm 8 projecting from the center shell 2, so that any unnecessary movement of the diaphragm 8 is prevented when the rear shell 2 is mounted (described later), and the efficiency of the assembling operation increases.

With the rear diaphragm 8 left in the tacked state, the rear shell 2 is pressed in the direction of the arrow F. In consequence, since the bead retaining portion 9 does not come into contact with the inner surface of the bead 10 of the rear diaphragm 8, the rear shell 2 moves smoothly inside the rear diaphragm 8 until the edge of the bead 10 abuts against the outer peripheral portion 2a of the rear shell 2, as shown in FIG. 5. As the rear shell 2 is further pressed in the same direction, the slant outer edge portion 10a of the bead 10 is pressed against the center shell 4 and eventually fits into the bead retaining groove 9a as if rotated. In the meantime, the rear end portion 4b of the center shell 4 abuts against the outer peripheral portion 2a of the rear shell 2, thus completing the assembly of the center shell 4, the rear shell 2 and the rear diaphragm 8.

It is noted that the diaphragm 8 is thus formed so that the inner diameter $d_i$ of the bead 10 in a free condition, i.e. in a condition wherein no external force due to the shells is acting on the bead 10, is larger than the diameter $D_o$ of the insertion-side edge portion 9b of the bead retaining portion 9.

Since the rear shell 2 can be mounted without any contact of the bead retaining portion 9 with the inner surface of the bead 10 of the rear diaphragm 8, it is unnecessary to bend the rear diaphragm 8 in advance of the assembly process, and hence assembly efficiency can be improved.

In the assembled state, the bead 10 of the diaphragm 8 is firmly retained in the bead retaining groove 9a by the rear end portion 4a of the center shell 4 and there is therefore no fear of the bead 10 disengaging from the groove 9a. Thereafter, the front shell 1 is assembled.

Since in this embodiment the outer edge portion 10a of the bead 10 is slanted so that the diameter thereof gradually increases toward the rear end, the bead 10 is readily bent radially inward by pressing the rear shell 2 and hence assembly efficiency correspondingly improves.

Although in the foregoing embodiment the present invention is exemplarily applied to a tandem type pneumatic booster that has a center shell, it should be noted that the present invention is not necessarily limitative thereto but may also be applied to a so-called single type pneumatic booster in which no center shell is provided and the front shell is employed as a forward shell.

As has been described above, in the present invention the rear shell can be moved toward the diaphragm without any contact of the bead retaining portion with the inner surface of the diaphragm, and it is therefore unnecessary to bend the diaphragm in advance of the assembly process and hence possible to improve the assembling efficiency correspondingly. In addition, since the assembly process is effected without bending the diaphragm in advance, the damage can be prevented.

Although the present invention has been described through specific terms, it should be noted that the described embodiment is not necessarily exclusive and that various changes and modifications may be imparted thereto without departing from the scope of the invention which is limited solely by the appended claims.

What is claimed is:

1. A pneumatic booster, comprising:
    a housing which includes a first shell and a second shell; and
    a diaphragm inside said housing and secured at the outer peripheral portion thereof to said housing, said diaphragm having a bead formed on the outer peripheral portion thereof;
    said second shell having a bead retaining portion which has an annular bead retaining groove that is generally U-shaped in section and opens radially outwardly, said U-shaped groove having side wall portions generally opposing each other and a bottom portion;

said first shell having an outer peripheral portion;

said bead being received into said bead retaining groove over one of said side wall portions and clamped between said groove and said outer peripheral portion of said first shell, said bead being forced into said groove by said outer peripheral portion of said first shell and clamped between said groove of said second shell and said outer peripheral portion of said first shell when said first shell is assembled with said second shell; and wherein said diaphragm is formed such that the inner diameter of said bead in a free condition is larger than the diameter of said one of said wall portions of the annular groove of the rearward shell.

2. The pneumatic booster of claim 1, wherein:

said housing further comprises a third shell, said first shell being a center shell, said second shell being a rearward shell and said third shell being a forward shell;

said first shell is disposed between said second and third shells dividing said housing into rear and front chambers;

said first shell is mounted by said second and third shells; and said diaphragm is disposed inside said rear chamber.

3. A pneumatic booster according to claim 1, wherein said diaphragm has an annular portion which extends in a direction substantially perpendicular to the axial direction of said housing and a tubular portion which extends from the outer peripheral portion of said annular portion and which has an end portion, said bead being formed on said end portion of said tubular portion so as to extend radially outward.

4. A pneumatic booster according to claim 1, wherein the diameter of the other of said side wall portions is larger than that of said one of said side wall portions and wherein the end of said outer peripheral portion of said first shell abuts against a side surface of said other side wall portion.

5. A pneumatic booster according to claim 4, wherein said first shell has a flange on said end of said outer peripheral portion, and wherein said flange abuts against said side surface of said other side wall portion.

6. The pneumatic booster of claim 1, wherein the inner diameter of said bead is smaller than the diameter of said one of said wall portions when said bead is in said bead retaining groove between said groove and said outer peripheral portion of said first shell.

7. The pneumatic booster of claim 1, wherein said bead has a radially outwardly sloping surface in its free condition for engagement with said first shell.

* * * * *